(12) United States Patent
Ghani et al.

(10) Patent No.: US 6,215,769 B1
(45) Date of Patent: Apr. 10, 2001

(54) ENHANCED ACKNOWLEDGMENT PACING DEVICE AND METHOD FOR TCP CONNECTIONS

(75) Inventors: Nasir Ghani, Woburn; Sudhir Sharan Dixit, Weston, both of MA (US)

(73) Assignee: Nokia Telecommunications, Inc., Espoo (FI)

(*) Notice: Subject to any disclaimer, the term of this patent is extended or adjusted under 35 U.S.C. 154(b) by 0 days.

(21) Appl. No.: 09/167,882

(22) Filed: Oct. 7, 1998

(51) Int. Cl.[7] .................................................. H04L 12/56

(52) U.S. Cl. ........................ 370/230; 370/412; 709/234

(58) Field of Search ..................................... 370/229, 231, 370/235, 236, 410, 249, 412; 709/232, 233, 234, 235

(56) References Cited

U.S. PATENT DOCUMENTS

| | | |
|---|---|---|
| 5,042,029 | 8/1991 | Hayakawa . |
| 5,410,585 | 4/1995 | Kawaharata . |
| 5,546,389 | 8/1996 | Wippenbeck et al. . |
| 5,708,660 | 1/1998 | Riedel . |
| 5,748,615 | 5/1998 | Riedel et al. . |
| 5,768,627 | 6/1998 | Jones et al. . |
| 5,805,577 | 9/1998 | Jain et al. . |
| 5,805,585 | 9/1998 | Javitt et al. . |
| 5,812,527 | 9/1998 | Kline et al. . |
| 6,038,606 | * 3/2000 | Brooks et al. ........................ 709/235 |

OTHER PUBLICATIONS

"ATM Lecture", Internet http://syllabus.syr.edu/lst/Mweschen/Ist656/Week4/lecture/atm/atm.htm, pp. 1–5 (Feb. 6, 1997).

"Intergrated Services Digital Network (ISDN) Overall Network Aspects and Functions, Traffic Control and Congestion Control in B–ISDN", *International Telecommunication Union*, ITU–T Recommendation I.371, pp. 1–27 (Mar. 1993).

Giroux, N., "Technical Committee, Traffic Management Specification", *ATM Forum*, Version 4.0, af–tm–0056.000, pp. 1–59 (Apr. 1996).

(List continued on next page.)

*Primary Examiner*—Douglas W. Olms
*Assistant Examiner*—Ken Vanderpuye
(74) *Attorney, Agent, or Firm*—Altera Law Group LLC

(57) ABSTRACT

An enhanced acknowledgment pacing device and method for TCP connections is disclosed. The invention includes a link layer entity for receiving data packets from a source and forwarding the data packets to a forward data link, the link layer entity storing the received data packets in a data packet buffer until the data packets depart the link layer entity and are forwarded to the forward data link and an acknowledgment pacing device, coupled to the link layer entity, for pacing acknowledgment packets to be sent to the source in response to receiving the data packets from the source. The acknowledgment pacing device further includes an acknowledgment control unit for monitoring congestion at the link layer entity and generating a control signal for controlling the processing of acknowledgment packets based upon whether congestion is occurring at the link layer entity, an acknowledgment packet buffer, coupled to the acknowledgment control unit, for storing acknowledgment packets received from the acknowledgment control unit and a scheduler, coupled to the acknowledgment control unit and the acknowledgment buffer, the scheduler releasing acknowledgment packets to the source based upon the control signal generated by the acknowledgment control unit.

76 Claims, 8 Drawing Sheets

OTHER PUBLICATIONS

Kessler, G., "An Overview of ATM Technology", ATM Overview, pp. 1–10 (Jan. 1995).

Lambarelli, L., "ATM Service Categories: The Benefits to the User", *The ATM Forum: White Paper on Service Categories,* pp. 1–10 (date unknown).

Symborski, C., "What are the meaning of CBR, VBR, ABR, UBR?", Maintained by Carl Symborski, (Last Changed Aug. 20, 1996), pp. 1–2.

Yao, E. "ATM—The New Technology for Tomorrow's B–ISDN", pp. 1–23 (Dec. 1994).

* cited by examiner

```
/* TCP ACK Arrival Algorithm */
/* If link-layer entity is congested or ACK buffer is non-empty */
if ( (congestion_status()=ON) || (num_ACK>0) )
{
    /* Store incoming ACK in queue (FIFO, per-class, or per-flow) */
    Insert ACK at tail of respective ACK queue
    num_ACK=num_ACK+1 /* increment ACK count */

/* Check if this is the first ACK buffered */
    if (num_ACK=1)
        { pkt_counter=a_1 /* set counter to larger spacing */}
}
else
    { Send ACK to TCP source /* Not congested, pass-through */}

/* Data Packet Departure Algorithm */
/* Check if the ACK buffer is non-empty (i.e.,ACK's to send) */
if (num_ACK!=0)
{
    if (pkt_counter==0)/* check if ACK is to be sent*/
    {
        /* Scheduler determines next eligible ACK*/
        Dequeue ACK from head of eligible ACK queue
        Send ACK to TCP source num_ACK=num_ACK-1/* decrement ACK count */

/* Reset cell counter appropriately */
        if (congestion_status()=ON)
            { pkt_counter=a_1 /* increased spacing */ }
        else
            { pkt_counter=a_2 /* reduced spacing */ }
    }
    else /* pkt_counter not zero */
    {
        /* Check if congestion has abated */
        if ( (congestion_status()=OFF) && (pkt_counter>a_1) )
            { pkt_counter=a_2}
        else
            { pkt_counter=/* decrement packet counter */}
    }
}
```

Fig. 6

```
/* Check congestion status and return binary flag */
boolean congestion_status()      710    712
{
    /* Use hysterisis queue thresholds (QL,QH) */
    if ( (congested_flag=ON) && (queue_length < QL) )
    {
        /* Store congestion abatement status change in flag */
        congested_flag=OFF
    }
    else if ( (congested_flag=OFF) && (queue_length > QH) )
    {
        /* Store congestion onset status change in flag */
        congested_flag=ON
    }

/* Return congestion status */
    return (congested_flag)
}
```

```
810
    812     /* TCP ACK Arrival Algorithm */
    814    /* If link-layer enity is congested or ACK buffer is non-empty  */
           if ( (congestion_status()=ON) || (num_ACK>0) )
           {
              /* Store incoming ACK in queue (FIFO, per-class, or per-flow) */    816
              Insert ACK at tail of respective ACK queue ————— 818
              num_ACK=num_ACK+1 /* Increment ACK count */

820
              /* Check if this is the first ACK buffered */
              if (num_ACK=1)
                 {cell_counter=a₁* packet_cells/* set counter to larger spacing */} — 824
              }
           else
              { Send ACK to TCP source /* Not congested, pass-through */ } — 828

860    /* ATM Cell Departure Algorithm */
    862    /* Check if the ACK buffer is non-empty (i.e., ACK's to send) */
           if (num_ACK!=0)
           {
              if (cell_counter=0) /* check if ACK is to be sent */ —864
              {
                 /* Scheduler determines next eligible ACK */ — 870
                 Dequeue ACK from head of eligible ACK queue — 872
                 Send ACK to TCP source
                                         — 874
                 num_ACK=num_ACK-1/* decrement ACK count */ — 876

882      /* Reset cell counter appropriately */ —880
              if (congestion_status()=ON)
    884          { cell_counter=a₁* packet_cells/* increased spacing */ }
    886      else
    888          { cell_counter=a₁* packet_cells/* reduced spacing */ }
              }
              else /* cell_counter not zero */ — 890
              {
                 /* Check if congestion has abated */ —892
    894       if ( (congestion_status()=OFF) && (cell_counter >a₂* packet_cells) )
                    { cell_counter=a₁* packet_cells}
                                                    — 895
    896      else
    898          { cell_counter- /* decrement cell counter */}
              }
           }
```

ENHANCED ACKNOWLEDGMENT PACING DEVICE AND METHOD FOR TCP CONNECTIONS

BACKGROUND OF THE INVENTION

1. Field of the Invention

This invention relates in general to networks, and more particularly to an enhanced acknowledgment pacing device and method for TCP connections.

2. Description of Related Art

Today, an organization's computer network has become its circulatory system. Organizations have combined desktop work stations, servers, and hosts into Local Area Network (LAN) communities. These Local Area Networks have been connected to other Local Area Networks and to Wide Area Networks (WANs). It has become a necessity of day-to-day operation that pairs of systems must be able to communicate when they need to, without regard to where they may be located in the network.

During the early years of network computing, proprietary networking protocols were the standard. However, the development of the Open Systems Interconnection Reference Model introduced by the International Organization for Standardization (ISO) has led to an impressive degree of interworking, which generally allows end-user applications to work very well between systems in a network. Implementations are based on written standards that have been made available by volunteers from dozens of computer vendors, hardware component vendors and independent software companies.

During the last decade, LANs have been proliferating. This has created a recurring problem of how to minimize congestion and optimize throughput that must be solved by network managers. An early solution was to simply divide Local Area Networks into multiple smaller networks serving smaller populations. These segments were connected by bridges to form a single Local Area Network with traffic being segregated locally to each segment.

The evolution of new network types and Wide Area Networks created a need for routers. For example, the Internet is a set of networks connected by gateways, which are sometimes referred to as routers. Routers added filtering and firewalling capability to provide more control over broadcast domains, limit broadcast traffic and enhance security. A router is able to chose the best path through the network due to embedded intelligence. This added intelligence also allowed routers to build redundant paths to destinations when possible. Nevertheless, the added complexity of best path selection capability accorded by the embedded intelligence increased the port cost of routers and caused substantial latency overhead. Shared-media networks comprising distributed client/server data traffic, expanded user populations and more complex applications gave birth to new bandwidth bottlenecks. Such congestion produced unpredictable network response times, the inability to support the delay-sensitive applications and higher network failure rates.

Congestion control in modern networks is increasingly becoming an important issue. The explosive growth of Internet applications such as the World Wide Web (WWW) has pushed current technology to its limit, and it clear that faster transport and improved congestion control mechanisms are required. As a result, many equipment vendors and service providers are turning to advanced networking technology to provide adequate solutions to the complex quality of service (QoS) management issues involved. Examples include asynchronous transfer made (ATM) networks and emerging IP network services. Nevertheless, there is still the need to support a host of existing legacy IP protocols within these newer paradigms. In particular, the ubiquitous TCP transport-layer protocol has long been the workhorse transport protocol in IP networks, widely used by web-browsers, file/email transfer services, etc.

Transmission Control Protocol (TCP) is a part of the TCP/IP protocol family that has gained the position as one of the world's most important data communication protocols with the success of the Internet. TCP provides a reliable data connection between devices using TCP/IP protocols. TCP operates on top of IP that is used for packing the data to data packets, called datagrams, and for transmitting across the network.

The Internet Protocol (IP) is a network layer protocol that routes data across an Internet. The Internet Protocol was designed to accommodate the use of host and routers built by different vendors, encompass a growing variety of growing network types, enable the network to grow without interrupting servers, and support higher-layer of session and message-oriented services. The IP network layer allows integration of Local Area Network "islands".

However, IP doesn't contain any flow control or retransmission mechanisms. That is why TCP is typically used on top of it. Especially, TCP uses acknowledgments for detecting lost data packets. TCP/IP networks arc nowadays probably the most important of all networks, and operate on top of several (physical) networks, such as the ATM networks mentioned above. These underlying networks may offer some information about the condition of network and traffic, which may be used to provide feedback regarding congestion.

To manage congestion, TCP uses a sliding window mechanism coupled with reactive congestion control to adjust the sender's window size. The protocol adjusts its transmission behavior contingent to returning acknowledgment (ACK) packets sent from the remote receiver's end.

A problem with TCP, however, is that its congestion control mechanism is relatively slow. Most TCP implementations use very coarse timers to measure timeouts, i.e., roughly 200–500 ms granularity. Further, most TCP implementations rely on ACK delays or packet drops to detect congestion. As a result, excessive source window reductions can result in large amounts of bandwidth being wasted as the TCP source is forced to restart its transmission window. Further, many studies have shown that TCP does not perform very well over ATM networks, especially for larger WAN-type propagation delays.

To combat the above shortcomings with TCP, it is necessary to minimize the chances of network congestion by somehow incorporating faster congestion indication mechanisms in the TCP feedback loop. However, to ensure compatibility with current versions and to expedite market acceptance, any such attempt must preclude changes to the actual TCP protocol or its implementation.

Along these lines, a variety of ACK pacing schemes have been proposed. These ACK pacing schemes basically modulate the spacing of TCP ACK packets to limit source emissions during periods of congestion. ACK pacing is well-suited at the boundary of high speed (sub)networks, such as ATM, gigabit IP (i.e., optical WDM), or satellite. In essence this technique performs TCP traffic shaping at the access nodes. Such methodologies are specifically beneficial for advanced ATM data services, i.e., underlying ABR flow control or per-connection queuing, where congestion tends to buildup at the periphery of the ATM network, i.e., in the access nodes. If the forward link is congested, as indicated via some congestion metric, ACK packets are appropriately delayed before being sent to the source.

Other authors have proposed modifying fields in the ACK packets themselves, i.e., receiver-window size, to improve performance. However, such schemes either require accurate round-trip delay measurements or cannot maintain tight buffer control. Furthermore, rewriting ACK packet fields will require expensive checksum recomputations.

Although ACK pacing is an effective way of controlling TCP source behaviors, many of the proposed schemes are either too complex and/or overly sensitive to network parameter settings. Since studies have shown that TCP's throughput and fairness levels can be low in many high-speed network scenarios, it is necessary to devise efficient, practical schemes to enhance its performance. Although amending the protocol's functionality itself is also an option, this may not be a feasible alternative in the short-to-medium time frame. It is along these lines that the ACK pacing methods can provide significant benefits.

It can be seen that there is a need for a more robust, comprehensive scheme for ACK pacing.

It can also be seen that there is a need for ACK pacing that provides high throughput and precise levels of bandwidth fairness.

It can also be seen that there is a need for ACK pacing that significantly reduces TCP buffering delays and is applicable to a wide range of network scenarios.

It can also be seen that there is a need for ACK pacing that provides faster congestion indication without modifying the TCP protocol.

SUMMARY OF THE INVENTION

To overcome the limitations in the prior art described above, and to overcome other limitations that will become apparent upon reading and understanding the present specification, the present invention discloses an enhanced acknowledgment pacing device and method for TCP connections.

The present invention solves the above-described problems by providing a more robust, comprehensive scheme for ACK pacing. The ACK pacing according to the present invention provides high throughput and precise levels of bandwidth fairness. Further, the ACK pacing significantly reduces TCP buffering delays and is applicable to a wide range of network scenarios. Thus, the ACK pacing provides faster congestion indication without modifying the TCP protocol.

A system in accordance with the principles of the present invention includes a link layer entity for receiving data packets from a source and forwarding the data packets to a forward data link, the link layer entity storing the received data packets in a data packet buffer until the data packets depart the link layer entity and are forwarded to the forward data link and an acknowledgment pacing device, coupled to the link layer entity, for pacing ACK packets to be sent to the source in response to receiving the data packets from the source. The acknowledgment pacing device further includes an acknowledgment control unit for monitoring congestion at the link layer entity and generating a control signal for controlling the processing of acknowledgment packets based upon whether congestion is occurring at the link layer entity, an acknowledgment packet buffer, coupled to the acknowledgment control unit, for storing acknowledgment packets received from the acknowledgment control unit and a scheduler, coupled to the acknowledgment control unit and the acknowledgment buffer, the scheduler releasing acknowledgment packets to the source based upon the control signal generated by the acknowledgment control unit.

Other embodiments of a system in accordance with the principles of the invention may include alternative or optional additional aspects. One such aspect of the present invention is that the scheduler chooses ACK packets to release based upon a queuing strategy.

Another aspect of the present invention is that the queuing strategy includes sending a head-of-line ACK packet when aggregate ACK packet buffering is used.

Another aspect of the present invention is that the queuing strategy includes a weighted-round-robin (WRR) process for selecting an ACK packet in the ACK packet buffer for release when per-class or per-flow ACK packet buffering is used.

Another aspect of the present invention is that the weighted-round-robin (WRR) process uses weights for weighting the selection of the ACK packet for release inversely proportionally to a TCP maximum segment size (MSS) to the lessen a bias against smaller MSS flows.

Another aspect of the present invention is that the queuing strategy includes a fair-queuing (FQ) process for selecting an ACK packet in the ACK packet buffer for release when per-class or per-flow ACK packet buffering is used.

Another aspect of the present invention is that the acknowledgment control unit further includes an ACK packet pacing processor, the ACK packet pacing processor generating the control signal for controlling the processing of acknowledgment packets using a ACK packet arrival processor and a data packet departure processor.

Another aspect of the present invention is that the ACK packet arrival processor controls the processing of ACK packets to the ACK packet buffer by checking the congestion at the link layer entity and deciding whether to hold ACK packets in the ACK packet buffer or to send the ACK packet directly to the source without buffering the ACK packets in the ACK packet buffer.

Another aspect of the present invention is that the ACK packet arrival processor decides whether to hold ACK packets in the ACK packet buffer or to send the ACK packet directly to the source without buffering the ACK packets in the ACK packet buffer by determining if the link layer entity is congested, determining if the ACK packet buffer is empty, storing an ACK packet in the buffer if the link layer entity is congested or the ACK packet buffer is not empty, and forwarding the ACK packet to the source if the ACK packet buffer is empty and the link layer entity is not congested.

Another aspect of the present invention is that the ACK packet is stored in the ACK packet buffer and gated out by the scheduler if the ACK packet is a first ACK packet to be buffered in the ACK packet buffer during congestion.

Another aspect of the present invention is that the ACK control unit increases a spacing between ACK packets gated from the ACK packet buffer if the ACK packet is the first ACK packet to be buffered in the ACK packet buffer during congestion.

Another aspect of the present invention is that the data packet departure processor decreases a spacing between the release of ACK packets from the ACK packet buffer if congestion in the link layer entity has abated.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 6 illustrates the psuedocode for the TCP ACK arrival and data departure 660 method according to the present invention;

FIG. 7 illustrates psuedocode for a congestion status method using two hysterisis queue thresholds, QL and QH; and FIG. 8 illustrates the psuedocode for the enhanced TCP ACK arrival and ATM cell departure methods according to the present invention

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an enhanced acknowledgment pacing device and method for TCP connections. A more robust, comprehensive scheme for ACK pacing is provided which allows high throughput and precise levels of bandwidth fairness. Further, the ACK pacing significantly reduces TCP buffering delays and is applicable to a wide range of network scenarios. Thus, the ACK pacing according to the present invention provides faster congestion indication without modifying the TCP protocol.

Figure 1:
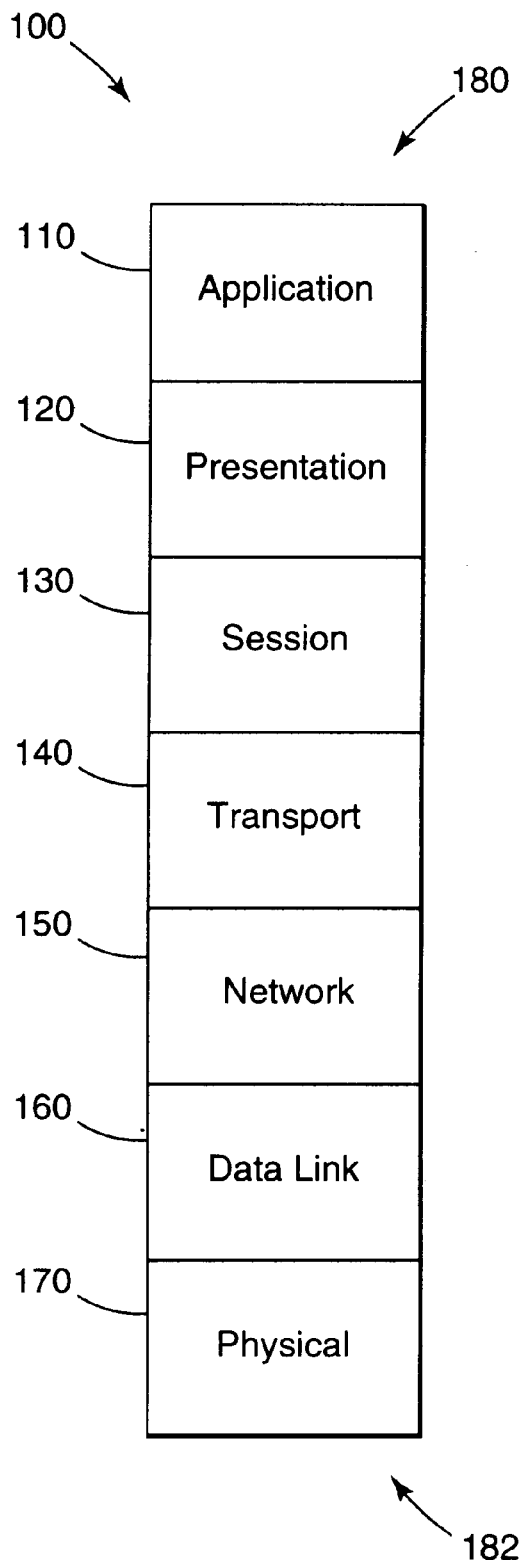
FIG. 1 illustrates the OSI model which includes seven layers.

FIG. 1 illustrates the OSI model 100 which includes seven layers, including an Application Layer 110, Presentation Layer 120, Session Layer 130, Transport Layer 140, Network Layer 150, Data Link Layer 160, and Physical Layer 170. The OSI model 100 was developed by the International Organization for Standardization (ISO) and is described in ISO 7498, entitled "The OSI Reference Model", and which is incorporated by reference herein.

Each layer of the OSI model performs a specific data communications task, a service to and for the layer that precedes it (e.g., the Network Layer provides a service for the transport layer). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic bank teller transaction can be tracked through the multi-layer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top 180 to bottom 182 in one open system (Open System A, the source), across the communications line, and then from bottom 182 to top 180 in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed.

The ISO has specifically defined all seven layers, which are summarized below in the order in which the data actually flows as they leave the source:

Layer 7, the Application Layer 1 10, provides for a user application (such as getting money from an automatic bank teller machine) to interface with the OSI application layer. That OSI application layer 110 has a corresponding peer layer in the other open system, the bank's host computer.

Layer 6, the Presentation Layer 120, makes sure the user information (a request for $50 in cash to be debited from your checking account) is in a format (i.e., syntax or sequence of ones and zeros) the destination open system can understand.

Layer 5, the Session Layer 130, provides synchronization control of data between the open systems (i.e., makes sure the bit configurations that pass through layer 5 at the source are the same as those that pass through layer 5 at the destination).

Layer 4, the Transport Layer 140, ensures that an end-to-end connection has been established between the two open systems and is often reliable (i.e., layer 4 at the destination confirms the request for a connection, so to speak, that it has received from layer 4 at the source).

Layer 3, the Network Layer 150, provides routing and relaying of data through the network (among other things, at layer 3 on the outbound side an address gets placed on the envelope which is then read by layer 3 at the destination).

Layer 2, the Data Link Layer 160, includes flow control of data as messages pass down through this layer in one open system and up through the peer layer in the other open system.

Layer 1, the Physical Interface Layer 170, includes the ways in which data communications equipment is connected mechanically and electrically, and the means by which the data moves across those physical connections from layer 1 at the source to layer 1 at the destination.

Figure 2:
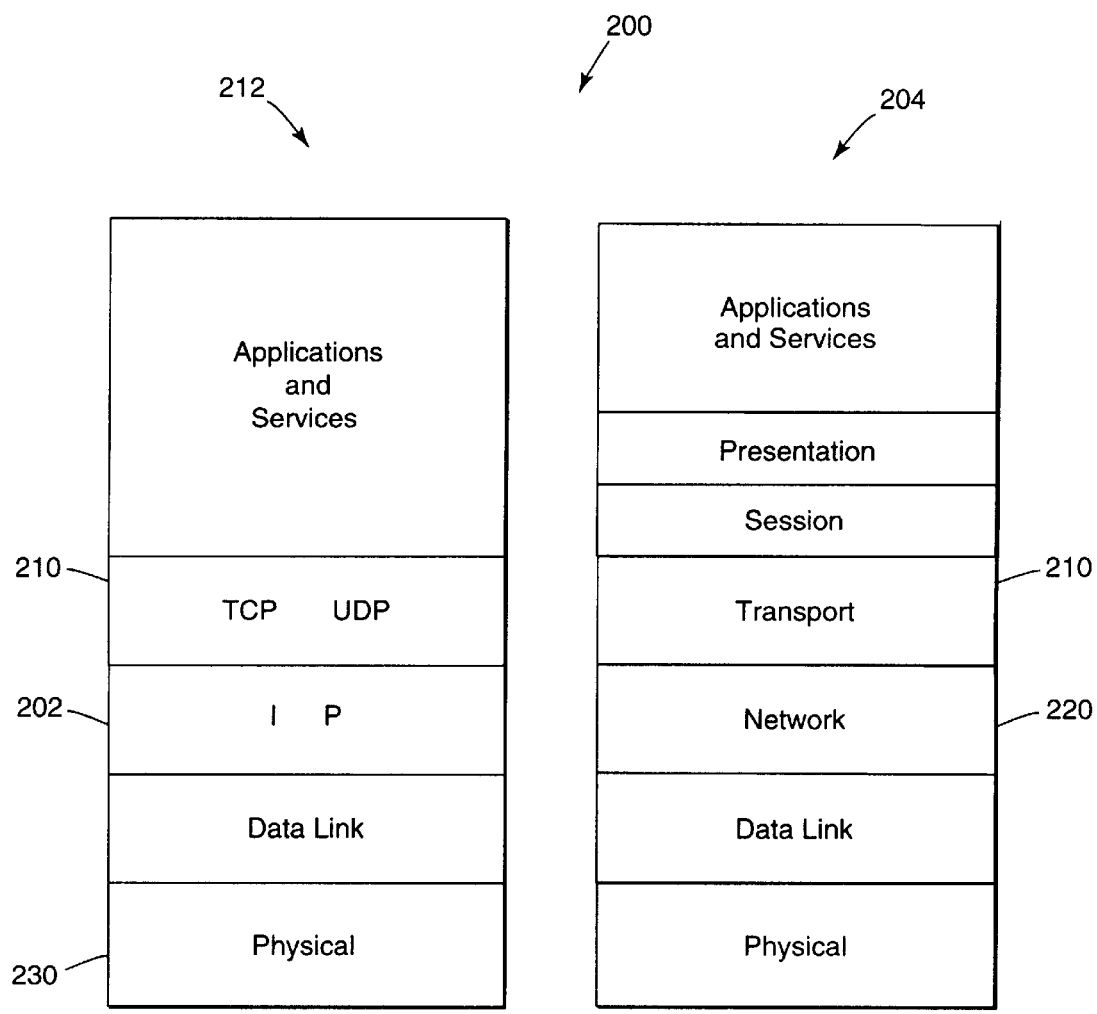
FIG. 2 illustrates a comparison of the Internet Protocol Network Layer and the OSI seven layer model.

FIG. 2 is a comparison 200 illustrating where the Internet Protocol Network Layer 202 fits in the OSI seven layer model 204. In FIG. 2, the transport layers 210 provides data connection services to applications and may contains mechanisms that guarantee that data is delivered error-free, without omissions and in sequence. The transport layer 210 in the TCP/IP model 212 sends segments by passing them to the IP layer 202, which routes them to the destination. The transport layer 210 accepts incoming segments from IP 202, determines which application is the recipient, and passes the data to that application in the order in which it was sent.

Thus, the Internet Protocol 202 performs Network Layer functions and routes data between systems. Data may traverse a single link or may be relayed across several links in an Internet. Data is carried in units called datagrams, which include an IP header that contains layer 3 220 addressing information. Routers examine the destination address in the IP header in order to direct datagrams to their destinations. The IP layer 202 is called connection less because every datagram is routed independently and the IP layer 202 does not guarantee reliable or in-sequence delivery of datagrams. The IP layer 202 routes its traffic without caring which application-to-application interaction a particular datagram belongs to.

The TCP layer 210 provides a reliable data connection between devices using TCP/IP protocols. The TCP layer 210 operates on top of the IP layer 202 that is used for packing the data to data packets, called datagrams, and for transmitting the across the underlying network via physical layer 230.

However, the IP protocol doesn't contain any flow control or retransmission mechanisms. That is why the TCP layer 210 is typically used on top of the IP layer 202. In contrast, TCP protocols provide acknowledgments for detecting lost data packets.

Figure 3:
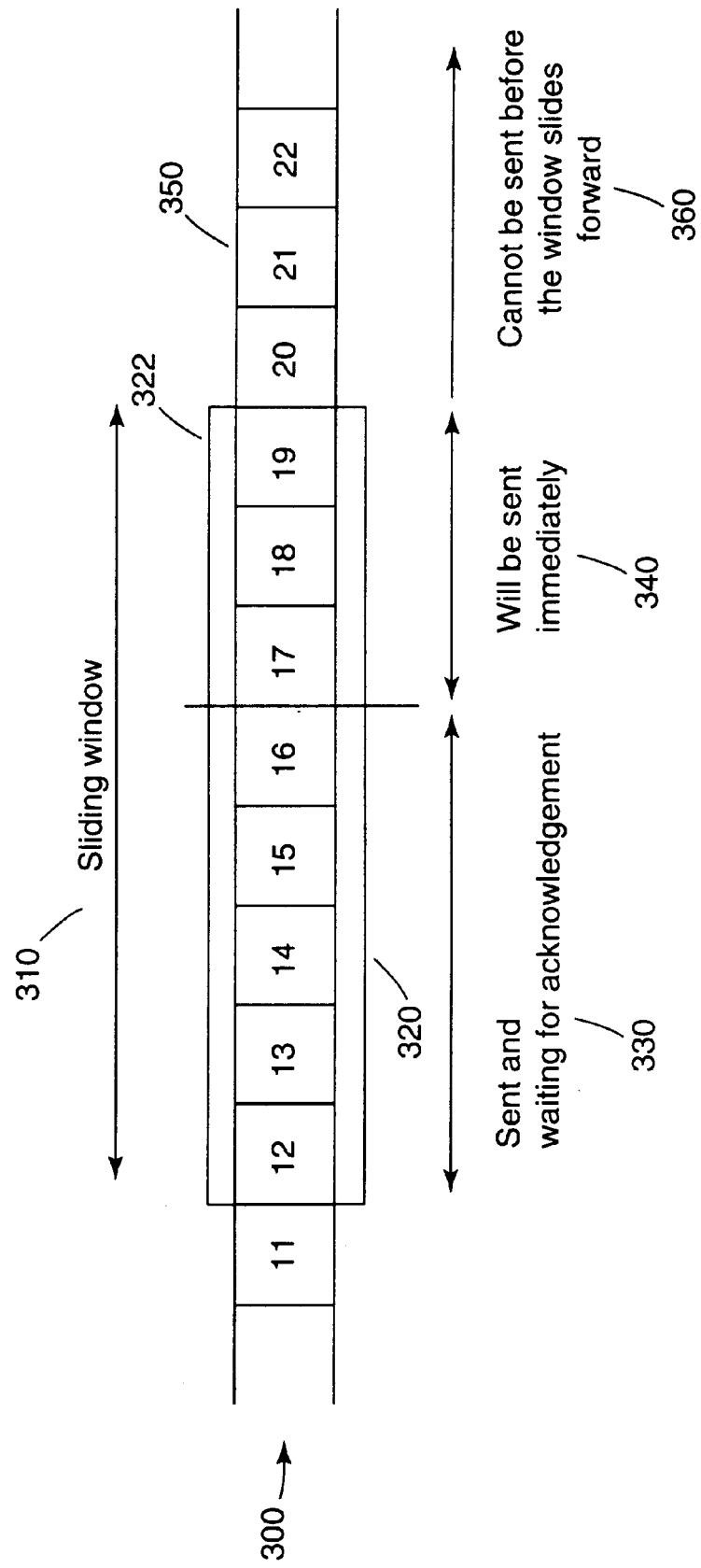
FIG. 3 illustrates a packet stream and a TCP sliding window.

FIG. 3 illustrates a packet stream 300 and a TCP sliding window 310. One of the main features of a TCP source is that it uses a sliding window 310 that determines the bytes and, consequently, the IP packets that can be sent before an acknowledgment is received from the receiver. This makes it possible to adjust the effective transmission rate of the source.

When the TCP source increases the size of the sliding window 310, its average transmission rate increases, too. The sliding window 310 is on top of octets 12–19. Octets up to 11 have been transmitted and the sliding window 310 has moved past them. Inside the sliding window 310, there are two octet groups 320, 322. The first octet group 320 is the octets from 12 to 16, which have been transmitted 330. The second group of octets 322 in the sliding window 310 are octets 17–19, which have not yet been transmitted. The second group of octets 322 can be sent immediately 340. Finally, octets 20 and upwards 350 cannot be transmitted 360. Octet 12 has to be acknowledged and the sliding window slid forward before octet 20 may be transmitted. Thus, TCP provides retransmission of lost data packets and flow control using this TCP sliding window 310. The sliding window 310 is actually the minimum of the congestion window of the window advertisement which is sent by the receiver.

Figure 4:
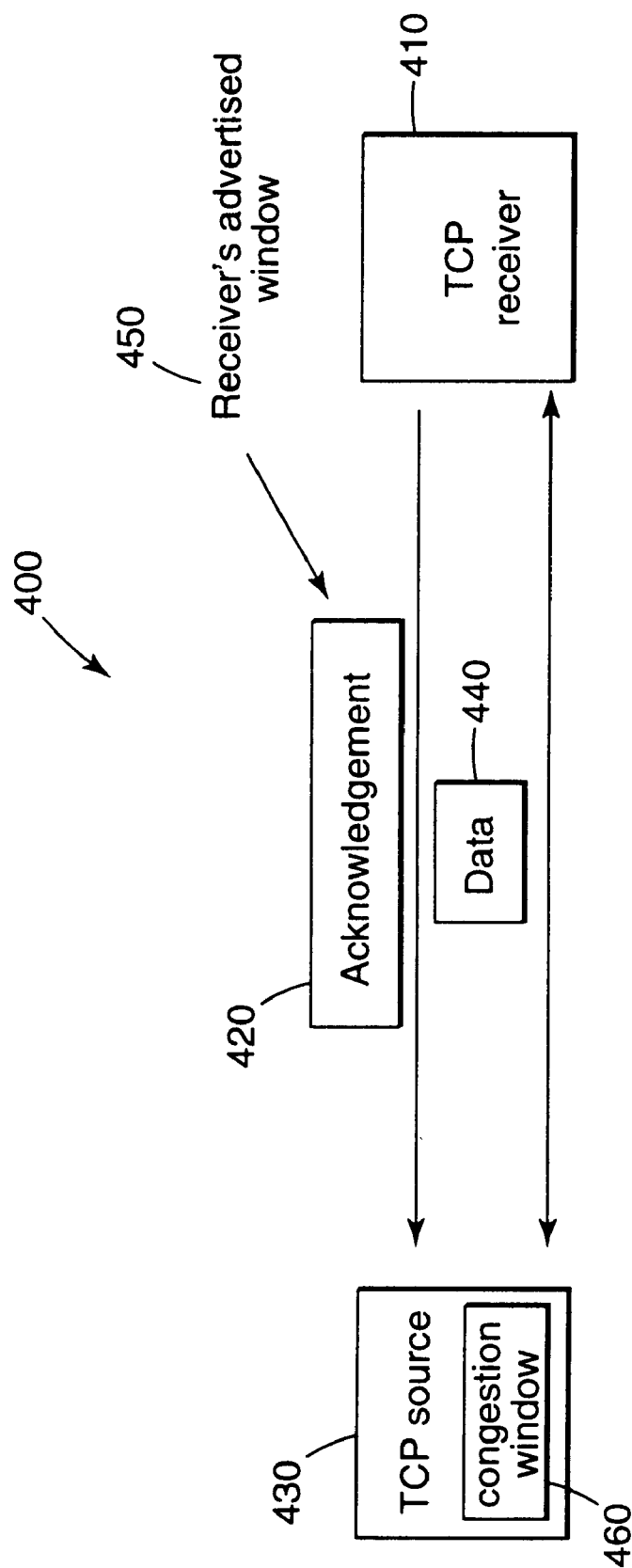
FIG. 4 illustrates a network system wherein a receiver provides acknowledgments to the source as well as receives data from the source.

FIG. 4 illustrates a TCP network system 400 wherein a receiver 410 provides acknowledgments 420 to the source 430 as well as receives data 440 from the source 430. The receiver 410 sends acknowledgment packets 420 that also include window advertisement data 450 for informing the source 430 of the capacity of the receiver 410 to handle incoming data 440. Thus, the receiver 410 can advertise a suitable window size 450 for flow control purposes. In practice, the window advertisement 450 specifies how many additional octets of data the receiver 410 is prepared to accept. The source 430 is supposed to adjust its sliding window according to this advertisement, unless the congestion window 460 maintained by the source 430 is smaller.

The second window, the congestion window 460, is used internally at the TCP source 430 for dropping the size of the sliding window. This occurs if a timer expires telling that a data packet has been sent, but no acknowledgment has arrived within a certain time period. This means that the data packet has been lost which is most probably caused by network congestion. In order not to make the congestion worse, the TCP source 430 drops its transmission rate by reducing the size of the sliding window. The relation of these windows can be expressed as:

$$T_w = \mathrm{MIN}(\text{window advertisement, congestion window}),$$

where $T_w$, refers to the transmission window, i.e., the sliding window.

In principle, the congestion window 460 and feedback information included in the advertisement window 450 provided by the underlying network can be used for the same purpose, namely to adjust the transmission rate of the TCP source 430 according to the load and congestion of the network. However, one important difference between the congestion window 460 and feedback information included in the advertisement window 450 is that the congestion window 460 works on the end-to-end basis and is typically quite slow to react to changes due to relatively long timeouts. Thus, the congestion window 460 can not also give any detailed information. The TCP source 410 simply knows that a packet has been discarded which may not give the exact picture about the network condition. Feedback information included in the advertisement window 450, on the other hand, may be more accurate and may react faster to the changing conditions.

An underlying network can use the receiver's window advertisements 450 carried in acknowledgment packets 420 for controlling the transmission speed of a TCP source 410. This may be accomplished by adding device or network functionality, herein referred to as Feedback Information Converter (FIC).

Thus, TCP uses a sliding window protocol where the source 430 adjusts its window size based upon returning ACK packets 420 from the receiver 410. Hence the window's 460 growth rate will be related to the rate of these returning packets 420. Therefore, it is evident that by modifying the timing of the returning ACK stream 420, the growth of the source window 460 can be controlled. It is this fundamental principle upon which ACK pacing methods are based. Specifically, these methods appropriately delay returning ACK packets 420 in congested network elements, e.g., access nodes and IP routers, to limit excessive emissions by the source 430. When properly done, ACK pacing can reduce TCP timeouts, limit queue buildups, and thereby improve overall connection goodputs.

Due to the largely asymmetric nature of TCP traffic profiles, ACK pacing, is really only required at the TCP source side 430. This is a noteworthy point, since it implies that the required ACK pacing functionality need only be limited to large web-servers/file-hosts. Hence no expensive upgrades are required for a much larger, diverse user access base. It should be mentioned, however, that ACK pacing assumes good rate control inside the network. This essentially abstracts the network to a fairly constant bandwidth, causing congestion to occur primarily at the access nodes.

Advanced ATM bearer capabilities, e.g., VBR-nrt, ABR and GFR, can realistically achieve these conditions. Furthermore, it is expected that emerging rate guarantees in high-speed IP routers will also yield conditions favorable towards ACK pacing.

However, as stated above, many of the current ACK pacing methods are not particularly amenable to implementation. For example, fast-TCP (F-TCP) required knowledge of the underlying data "clearing" rate in the forward direction. This can either be the link capacity or for the case of the ATM available bit rate (ABR) service category, the connection's allowed cell rate (ACR), etc. The computed delays for the ACK packets 420 are based upon this rate.

Clearly, such schemes require more advanced information processing methods and can be problematic if the underlying rate varies widely. Furthermore, delayed emission of ACK packets 420 by the remote TCP client 410 can compound the sensitivity issues and significantly degrade the performance of such schemes. Also, no explicit fairness provision can be provided by these schemes since they simply buffer returning ACK packets 420 in an aggregate manner, i.e., first-in-first-out (FIFO). Another ACK pacing method, the ACK bucket scheme, requires too much per-flow state, essentially "tracking" the windowing behaviors of each TCP flow.

Figure 5:
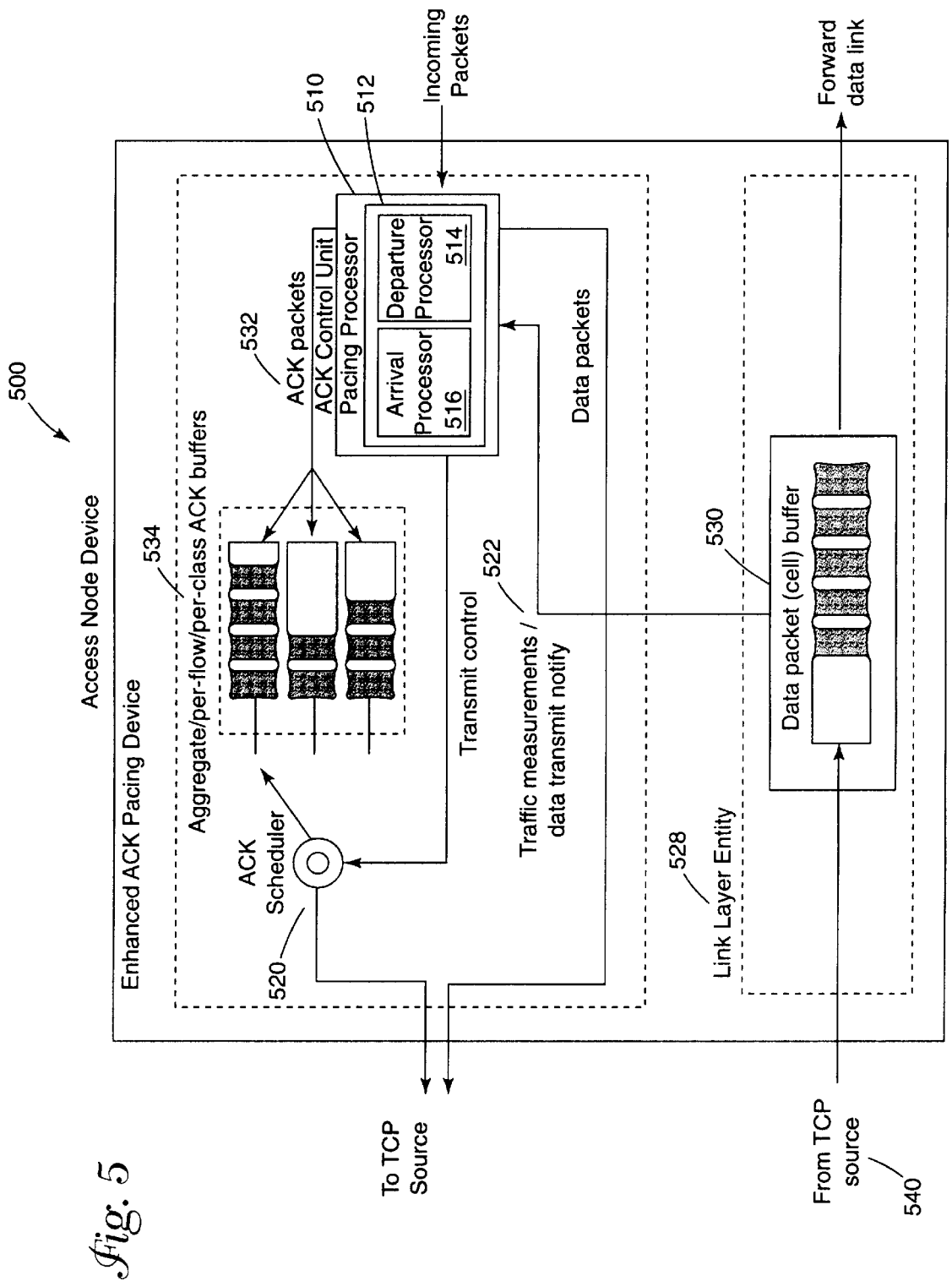
FIG. 5 illustrates the enhanced ACK pacing device according to the present invention.

FIG. 5 illustrates the enhanced ACK pacing device 500 according to the present invention. The ACK pacing device 500 relies on queue length information to infer congestion levels and does not require any additional (expensive) timer mechanisms. The ACK pacing device 500 illustrated in FIG. 5 is very generic and can be tailored to fit a wide range of networks.

In FIG. 5, an ACK control unit 510 is provided. The ACK control unit 510 controls the processing of ACK packets during both overload (i.e., congestion) and underload periods along with the operation of the ACK scheduler unit 520. The ACK control unit 510 relies on traffic measurements and data transmit notifications 522 from the underlying link-layer entity 528 and the data packet buffer 530. During congestion periods, returning ACK packets 532 are stored in the ACK buffers 534 using appropriate classification granularities (aggregate, per-class, per-flow) and gated out at an appropriately chosen rate. Specifically, the emission of ACK packets 532 during congested periods are performed so as to allow the buffers 534 to empty in reasonable time. When congestion subsides, the ACK emission rate is then increased to allow for improved bandwidth utilization. Note the ACK control unit 510 activates the ACK scheduler unit 520 to emit ACK packets 532 in the buffers 534 in all cases.

Since TCP is an expansive protocol, it always attempts to increase it transmission quota barring any receiver window limitations. This means that for large (bulk) file transfers, the regular TCP protocol will repeatedly increase its window size, loose packets, and then slow down. As the volume of data in the system increases, so does the number of ACK packets 532.

This point has a very subtle implication for ACK pacing schemes. Namely, the data packet 540 growth in the regular TCP protocol will be "replaced" by ACK packet 532 growth. This is referred to as the ACK buffer "drift" phenomenon. The rate of this drift will be linear (i.e., fast) for the case of ACK pacing with TCP connections in slow start phases, and will be sub-linear for ACK pacing with TCP connections in congestion avoidance phases.

There are two possible methods to address this problem. The simpler approach is to provide ACK buffers 534 with sufficient capacity for the ACK packets 532 and employ drop-from-front strategies in rare event of ACK buffer 534 exhaustion. Typically, ACK numbers in the front will most likely pertain to lower sequence numbers than those for arriving packets 540. This buffering approach is very reasonable, since ACK packets 532 are small (40 bytes), and most file transfers are not infinite. For example, an ACK buffer 534 of 64 kB of RAM can hold approximately 1,700 ACK packets 532, which is more than adequate for 155 Mb/s WAN links.

Another approach would be to track TCP sequence numbers using two variables, i.e., per-flow accounting for the last-in and last-out values. This approach can yield smaller memory requirements, but requires ACK number re-writing (i.e., check sum recomputations). Also, if ACK packets 532 arrive out of sequence, special considerations are necessary. Furthermore, it is likely that the other fields present in ACK packets 532, such as receiver window sizes and URG/RST flags, may also contain non-redundant information which can complicate matters further.

Thus, the ACK buffering approach is more feasible from an implementation perspective. The ACK buffering approach posts minimal additional constraints and does not tamper with any fields in the TCP packet 532.

As shown in FIG. 5, in the forward direction of data flow, the link layer entity 528 can be representative of a wide range of underlying technologies. Examples include dedicated links or ATM VC's, or IP flow classes. Furthermore, the link layer entity 528 can be either dedicated to a single TCP flow, e.g., ATM VC, etc., or be shared among a group of TCP flows (traffic aggregation). Similarly, the ACK pacing in the reverse direction can be done on different levels. For example, if per-flow queuing is done in the forward direction., then per-flow ACK pacing is also necessary in the reverse direction, i.e., per flow data/per-flow ACK.

If, however aggregate or class-based ACK pacing is done in forward direction, then it may be desirable to do likewise in the reverse direction (aggregate data/aggregate ACK, per-class data/per-class ACK). Others may decide to do simple, aggregate queuing in the forward direction, yet more advanced per-flow ACK buffering in the reverse direction. This approach improves fairness amongst flows aggregated onto the same link-layer entity 530, without requiring high speed per-flow buffering and scheduling techniques in the forward direction. Although per-flow ACK accounting is still required for incoming ACK packets 532, it is restricted to the network edge where the processing rate requirements are also significantly reduced since ACK packets 532 pertain to larger IP packet sizes. By choosing scheduler allocations, i.e., weights, inversely proportional to a flow's TCP maximum segment size (MSS), the bias against smaller MSS flows can be lessened (to an extent).

With the ongoing standardization efforts for a differentiated services architecture, the latter philosophy fits in quite nicely. Namely, per-flow accounting/overhead is limited to the access parts of the network, i.e., where ACK pacing is done, reducing complexity within the backbone. Since most access nodes will carry much fewer connections than backbone devices, this approach is very feasible in emerging networks.

In light of the above discussion, the ACK scheduler 520 can be specified as being fairly generic, borrowing from a variety of packet scheduling methods to improve fairness. For example, in the simplest form of aggregate (FIFO) ACK buffering, the scheduler 520 merely has to send the head-of-line (HOL) ACK. For more advanced per-class or per-flow ACK buffering strategies, a weighted-round-robin (WRR) or fair-queuing (FQ) scheduler can be implemented to "choose" the next suitable ACK for transmission.

The ACK control unit 510 includes a ACK pacing processor 512 for controlling the pacing of ACK packets to the source. The ACK pacing processor includes two main components: the data packet departure processor 514 and the ACK arrival processor. The ACK arrival processor 516 checks congestion levels and decides whether or not to hold incoming ACK packets. The data packet departure processor 514 monitors congestion levels via the link layer entity 528 and data packet buffer 530 and decides when to "clock" out ACK packets 532 to the source.

FIG. 6 illustrates the psuedocode 600 for the TCP ACK arrival 610 and data departure 660 method according to the present invention. The TCP ACK arrival 610 and data departure 660 method are executed for all incoming TCP ACK packets.

In FIG. 6, it is assumed that queue objects exist for enqueuing/dequeuing ACK packets, and that a running count of the number of buffered ACK packets is kept, e.g., num_ACK 604. In case of link-layer congestion and/or a non-empty ACK buffer 612, an incoming ACK packet is stored in the buffer 614. The buffered ACK packets are kept in the buffer and can only be sent out appropriately by the data packet departure method 660.

As discussed previously, the ACK buffering can be done on an aggregate basis or more selective per-class/per-flow basis as discussed above with reference to FIG. 5. If the ACK packet arrives at an empty buffer and there is no congestion 640, it is simply forwarded onwards to the TCP source (i.e., transparent pass-through) 642. However, if this is the first ACK to be buffered 630, then in order to "jump-start" the ACK emission process, this ACK packet must be gated out after an appropriate interval 632.

To avoid any dependencies on expensive timer mechanisms, the emission of ACK packets should be associated with the underlying data packet departure process 660 in the link-layer entity. Namely, the during congestion, ACK packets are sent after every $\alpha_1$ data packets have been emitted, where $\alpha_1$ is termed an (integral) slow-down factor.

From an implementation perspective, the above functionality can be achieved elegantly by using a simple counter variable, e.g., pkt_counter 644. For the first ACK packet, the counter variable value is set to $\alpha_1$ and then decremented per data packet departure according to the data departure process 660. When the counter variable value reaches zero, a buffered ACK packet is released and the counter is reset.

Contrary to some expectations, a given value of $\alpha_1$ does not imply a TCP source slow-down of equivalent magnitude. Here, the issue is complicated by the many features of the TCP protocol, such as slow-start/congestion-avoidance phases, the "ACK-every-other property", delayed ACK timers, etc. For example, in the idealized case of infinite sources sending full-sized segments, with the ubiquitous "ACK-every-other" feature enabled, it can be shown that a value of $\alpha_1 > 3$ is required to throttle a TCP source. Alternatively, if the TCP source's end-system behaviors are unknown, then very large values of $\alpha_1$ can be used to "guarantee" queue length control. In other words, such values essentially inhibit all ACK emissions until congestion subsides (i.e., on/off type control), but usually give increased queue oscillations.

Note that in order to present a generic, more flexible specification, the psuedocode in FIG. 6 does not explicitly specify the congestion detection method. Speifically, the congestion_status( ) routine 620 simply returns a boolean value indicating whether or not the link layer entity is congested. Clearly a whole variety of congestion indication mechanisms can be used here. Some examples include queue lengths, averaged queue lengths, input rate overload measurements, and data loss rates. However, preferably the queue length should be used to simplify implementation complexities.

Psuedocode for a sample method 700 using two hysterisis queue thresholds, QL 710, QH 714, is illustrated in FIG. 7. In FIG. 7, the congestion status is checked and a binary flag is returned 702. Hysterisis queue thresholds, QL 710, QH 712 are used 720. If congestion exists and the queue length is less than QL 722, then congestion abatement status change is stored by setting the flag to a first state 724, i.e., congested_flag=OFF. Alternatively, if congestion does not exist and the queue length is greater than QH 730, the congestion onset status change is stored by setting the flag to a second state 732, i.e., the congested_fla=ON. The state of the binary flag is then returned 740.

Results show that if these thresholds 710, 712 are appropriately sized based upon the round-trip delays between the sources and access nodes (i.e., access network delays), near loss-less performance can be achieved. Since such delays are usually many times smaller than the end-to-end delays observed in WAN networks, sizeable reductions in the buffering requirements are possible with ACK pacing schemes according to the present invention.

Referring again to FIG. 6, the data packet departure method 660 is executed whenever a packet departs the link layer. The goal is to release stored ACK packets in a timely fashion, thereby properly controlling the congestion (queue) levels at the access node's link-layer buffer, i.e., minimizing packet losses. The method first checks to see if the there are any buffered ACK packets awaiting transmission 662 and whether the ACK emission counter, i.e., pkt_counter, has reached zero 664. If this is the case, a buffered ACK packet is released to the source 670.

After this, if congestion still exists 680, the inter-ACK packet spacing is maintained at one per $\alpha_1$ data packets by resetting pk_counter to $\alpha_1$ 682. This allows the data buffer in the data link layer to drain further. If congestion has abated 684, however, then the inter-ACK spacing is reduced to $\alpha_2$ data packets 686, allowing sources to send faster. The (X2 parameter is termed an integral speedup factor, and necessarily $\alpha_1 > \alpha_2$. If the counter is non-zero 688, then it is simply decremented 690. However, to prevent bandwidth under-utilization after congestion periods, if the counter is larger than $\alpha_2$, it is simply reset to $\alpha_2$ (i.e., especially for larger $\alpha_2$ values).

Again, due to complications arising from TCP specifics, an $\alpha_2=1$ value does not imply that TCP source rates will (approximately) equal the underlying link entity's rate. More specifically, for idealized conditions with the "ACK-every-other" feature, a value of $\alpha_2=2$ performs better.

Referring again to FIG. 5, note that the eligible ACK packets 532 are chosen based upon the queuing strategy used by the ACK scheduler 520. This overall mechanism does not require any expensive timer mechanisms to release stored ACK packets 532 as required in prior methods.

FIG. 8 illustrates the psuedocode 800 for the enhanced TCP ACK arrival 810 and ATM cell departure 860 methods according to the present invention. In the TCP ACK arrival process 810, a determination is made as to whether the link-layer entity is congested or whether the ACK buffer is non-empty 812. If the link layer entity is congested and the ACK buffer is not empty 814, incoming ACK are stored in the queue 816 (FIFO, per-class, or per-flow). ACK packets are stored at the tail of the respective ACK queues and the ACK count is incremented 818. Next, a check is made to determine if this ACK packet is the first ACK packet buffered 820. If this is the first ACK packet to be buffered 822, the cell counter is set to $\alpha_1$*packet cells so that the counter is set to a larger spacing 824. Otherwise 826, the ACK packet is sent to the TCP source 828.

In the ATM Cell departure process 860, a determination is made as to whether the ACK buffer is non-empty 862, i.e., are there ACK packets to send? If there are ACK packets to send 864, scheduler determines the next eligible ACK packet 870. The next eligible ACK packet is dequeued from the head of the eligible ACK queue 872 and is sent to the TCP source 874. The ACK count is decremented 876 and the cell counter is reset appropriately 880. If congestion exists 882, the cell counter is set to equal $\alpha_1$*packet cells to increase the spacing 884. Otherwise 886, the cell counter is set to equal $\alpha_2$*packet cells to reduce the spacing 888.

If the cell counter is not zero 890, a determination is made as to whether congestion has abated 892. If congestion has abated and the cell counter value is greater than $\alpha_2$*packet cells 894, then the cell counter is set to equal $\alpha_2$*packet cells 895. Otherwise 896, the cell counter is decremented 898.

Granted that the above packet handling methods are very generic, more flexibility exists for the case of ATM networks which use smaller packet (cell) sizes. Specifically, it is possible to perform ACK emission per data (fractional) packet emission and at the same time circumvent the use of any expensive timer mechanisms, i.e., the counter is now in terms of cells not packets (cell counter). Since a cell size is typically much smaller than a TCP MSS-sized packet, packets can now be emitted with more fined-grained time granularities. Namely, the $\alpha_1$ and $\alpha_2$ factors do not have to be integers anymore, as is the case in packet-based schemes. Consider a constant value, packet_cells, namely the number of cells in $$\text{packet\_cells} = \left(\left\lceil \frac{(TCP\_MSS + 40)}{48} \right\rceil + 1\right). \quad (1)$$

With reference again to FIG. 5, during congestion ACK packets 532 are emitted after every $\alpha_1$•packet_cells and during underload, $\alpha_2$•packet_cells. For the most part, the ACK arrival and cell departure methods are identical to their packet-based counterparts. For example, after every cell emission, the cell counter is decremented and when it reaches zero, a ACK packet 532 in buffer 534 is released by the ACK scheduler 520. During period when the ACK buffer 534 is empty, the counter value is reset appropriately.

In summary, the performance of the TCP protocol over ATM networks is an important area. Recently, various ACK pacing schemes have been proposed to improve TCP's interaction with the more advanced underlying ATM transport categories (i.e., ABR flow control, per-connection queuing). However, these schemes suffer from parameter sensitivity issues and may be difficult to realize in practice. Accordingly, an enhanced ACK pacing device has been disclosed that is capable of performing in a wide range of network scenarios. The scheme uses (more direct) queue-length congestion information to delay TCP ACK packets and can implement a wide range of fairness criterion. The method provides a robust means of improving end-to- end TCP throughput and bandwidth fairness. The buffering requirements in the access nodes are also significantly for a wide range of subnetworks.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An acknowledgment pacing device for pacing acknowledgment packets to be sent to a source in response to receiving data packets from the source, comprising:

an acknowledgment control unit for monitoring loading of a network and generating a control signal for controlling the processing of acknowledgment packets based upon the loading of the network;

an acknowledgment packet buffer, coupled to the acknowledgment control unit, for storing acknowledgment packets received from the acknowledgment control unit; and a scheduler, coupled to the acknowledgment control unit and the acknowledgment buffer, the scheduler releasing acknowledgment packets based upon the control signal generated by the acknowledgment control unit.

2. The acknowledgment pacing device of claim 1 where the scheduler chooses acknowledgment packets to release based upon a queuing strategy.

3. The acknowledgment pacing device of claim 2 wherein the queuing strategy comprises sending a head-of-line acknowledgment packet when aggregate acknowledgment packet buffering is used.

4. The acknowledgment pacing device of claim 2 wherein the queuing strategy comprises a weighted-round-robin (WRR) process for selecting an acknowledgment packet in the acknowledgment packet buffer for release when per-class or per-flow acknowledgment packet buffering is used.

5. The acknowledgment pacing device of claim 4 wherein the weighted-round-robin (WRR) process uses weights for weighting the selection of the acknowledgment packet for release inversely proportionally to a TCP maximum segment size (MSS) to the lessen a bias against smaller MSS flows.

6. The acknowledgment pacing device of claim 2 wherein the queuing strategy comprises a fair-queuing (FQ) process for selecting an acknowledgment packet in the acknowledgment packet buffer for release when per-class or per-flow acknowledgment packet buffering is used.

7. The acknowledgment pacing device of claim 1 wherein the acknowledgment control unit further comprises an acknowledgment packet pacing processor, the acknowledgment packet pacing processor generating the control signal for controlling the processing of acknowledgment packets using a acknowledgment packet arrival processor and a data packet departure processor.

8. The acknowledgment pacing device of claim 7 wherein the acknowledgment packet arrival processor controls the processing of acknowledgment packets to the acknowledgment packet buffer by checking a congestion level of the network and deciding whether to hold acknowledgment packets in the acknowledgment packet buffer or to send the acknowledgment packet directly to the source without buffering the acknowledgment packets in the acknowledgment packet buffer.

9. The acknowledgment pacing device of claim 7 wherein the acknowledgment packet arrival processor decides whether to hold acknowledgment packets in the acknowledgment packet buffer or to send the acknowledgment packet directly to the source without buffering the acknowledgment packets in the acknowledgment packet buffer by determining if the network is congested, determining if the acknowledgment packet buffer is empty, storing an acknowledgment packet in the buffer if the network is congested or the acknowledgment packet buffer is not empty, and forwarding the acknowledgment packet to the source if the acknowledgment packet buffer is empty and the network is not congested.

10. The acknowledgment pacing device of claim 9 wherein the acknowledgment packet is stored in the acknowledgment packet buffer and gated out by the scheduler if the acknowledgment packet is a first acknowledgment packet to be buffered in the acknowledgment packet buffer during congestion.

11. The acknowledgment pacing device of claim 10 wherein the acknowledgment control unit increases a spacing between acknowledgment packets gated from the acknowledgment packet buffer if the acknowledgment packet is the first acknowledgment packet to be buffered in the acknowledgment packet buffer during congestion.

12. The acknowledgment pacing device of claim 11 wherein the acknowledgment control unit increases the spacing between acknowledgment packets by setting a packet counter variable to a first predetermined value.

13. The acknowledgment pacing device of claim 12 wherein the packet counter variable is decremented as when a data packet departs from the network.

14. The acknowledgment pacing device of claim 13 wherein the scheduler releases a buffered acknowledgment packet when the pack et counter variable is decremented to zero and the acknowledgment control unit resets the packet counter variable.

15. The acknowledgment pacing device of claim 8 wherein the congestion level of the network is determined by analyzing a queue length representing a capacity for a data packet buffer.

16. The acknowledgment pacing device of claim 15 wherein the network is indicated as being non-congested when the queue length is less than a low threshold.

17. The acknowledgment pacing device of claim 15 wherein the network is indicated as being congested when the queue length is greater than a high threshold.

18. The acknowledgment pacing device of claim 7 wherein the data packet departure processor controls the release of acknowledgment packets from the acknowledgment packet buffer by monitoring congestion levels of the network and deciding when to gate acknowledgment packets from the acknowledgment buffer to the source.

19. The acknowledgment pacing device of claim 18 wherein the data packet departure processor decides when to gate acknowledgment packets from the acknowledgment buffer to the source by checking if acknowledgment packets are in the acknowledgment packet buffer awaiting transmission and if a packet counter variable set by the acknowledgment control unit has a value of zero, and releasing a buffered acknowledgment packet in the acknowledgment packet buffer to the source when the packet counter variable has a value of zero.

20. The acknowledgment pacing device of claim 19 wherein the data packet departure processor increases the spacing between the release of acknowledgment packets from the acknowledgment packet buffer if congestion still exists in the network.

21. The acknowledgment pacing device of claim 20 wherein the spacing a between the release of acknowledgment packets is increased by resetting the packet counter variable to a first predetermined value.

22. The acknowledgment pacing device of claim 21 wherein the data packet departure processor decrementing the packet counter variable if the value of the packet counter variable is non-zero.

23. The acknowledgment pacing device of claim 22 wherein the data packet departure processor resets the packet counter variable to the second predetermined value to prevent bandwidth under-utilization after congestion periods if the packet counter variable is larger than the second predetermined value.

24. The acknowledgment pacing device of claim 19 wherein the data packet departure processor decreases a spacing between the release of acknowledgment packets from the acknowledgment packet buffer if congestion in the network has abated.

25. The acknowledgment pacing device of claim 24 wherein the data packet departure processor decreases a spacing between the release of acknowledgment packets by resetting the packet counter variable to a second predetermined value, the second predetermined value being less than the first predetermined value.

26. The acknowledgment pacing device of claim 25 wherein the data packet departure processor decrementing the packet counter variable if the value of the packet counter variable is non-zero.

27. The acknowledgment pacing device of claim 26 wherein the data packet departure processor resets the packet counter variable to the second predetermined value to prevent bandwidth under-utilization after congestion periods if the packet counter variable is larger than the second predetermined value.

28. The acknowledgment pacing device of claim 19 wherein the congestion level of the network is determined by analyzing a queue length representing a capacity for a data packet buffer.

29. The acknowledgment pacing device of claim 28 wherein the network is indicated as being non-congested when the queue length is less than a low threshold.

30. The acknowledgment pacing device of claim 28 wherein the network is indicated as being congested when the queue length is greater than a high threshold.

31. The acknowledgment pacing device of claim 1 wherein the acknowledgment packet buffer buffers acknowledgment packets on an aggregate basis.

32. The acknowledgment pacing device of claim 1 wherein the acknowledgment packet buffer buffers acknowledgment packets by flow type, and wherein the scheduler releases the acknowledgment packets in the acknowledgment buffer taking into account the type of flows for the buffered acknowledgment packets.

33. An access node device, comprising;
 a link layer entity for receiving data packets from a source and forwarding the data packets to a forward data link, the link layer entity storing the received data packets in a data packet buffer until the data packets depart the link layer entity and are forwarded to the forward data link; and
 an acknowledgment pacing device, coupled to the link layer entity, for pacing acknowledgment packets to be sent to the source in response to receiving the data packets from the source, the acknowledgment pacing device further comprising:
  an acknowledgment control unit for monitoring congestion at the link layer entity and generating a control signal for controlling the processing of acknowledgment packets based upon whether congestion is occurring at the link layer entity;

an acknowledgment packet buffer, coupled to the acknowledgment control unit, for storing acknowledgment packets received from the acknowledgment control unit; and a scheduler, coupled to the acknowledgment control unit and the acknowledgment buffer, the scheduler releasing acknowledgment packets to the source based upon the control signal generated by the acknowledgment control unit.

34. The access node device of claim 33 where the scheduler chooses acknowledgment packets to be released based upon a queuing strategy.

35. The access node device of claim 34 wherein the queuing strategy comprises sending a head-of-line acknowledgment packet when aggregate acknowledgment packet buffering is used.

36. The access node device of claim 34 wherein the queuing strategy comprises a weighted-round-robin (WRR) process for selecting an acknowledgment packet in the acknowledgment packet buffer for release when per-class or per-flow acknowledgment packet buffering is used.

37. The access node device of claim 36 wherein the weighted-round-robin (WRR) process uses weights for weighting the selection of the acknowledgment packet for release inversely proportionally to a TCP maximum segment size (MSS) to the lessen a bias against smaller MSS flows.

38. The access node device of claim 34 wherein the queuing strategy comprises a fair-queuing (FQ) process for selecting an acknowledgment packet in the acknowledgment packet buffer for release when per-class or per-flow acknowledgment packet buffering is used.

39. The access node device of claim 33 wherein the acknowledgment control unit further comprises an acknowledgment packet pacing processor, the acknowledgment packet pacing processor generating the control signal for controlling the processing of acknowledgment packets using a acknowledgment packet arrival processor and a data packet departure processor.

40. The access node device of claim 39 wherein the acknowledgment packet arrival processor controls the processing of acknowledgment packets to the acknowledgment packet buffer by checking the congestion at the link layer entity and deciding whether to hold acknowledgment packets in the acknowledgment packet buffer or to send the acknowledgment packet directly to the source without buffering the acknowledgment packets in the acknowledgment packet buffer.

41. The access node device of claim 39 wherein the acknowledgment packet arrival processor decides whether to hold acknowledgment packets in the acknowledgment packet buffer or to send the acknowledgment packet directly to the source without buffering the acknowledgment packets in the acknowledgment packet buffer by determining if the link layer entity is congested, determining if the acknowledgment packet buffer is empty, storing an acknowledgment packet in the buffer if the link layer entity is congested or the acknowledgment packet buffer is not empty, and forwarding the acknowledgment packet to the source if the acknowledgment packet buffer is empty and the link layer entity is not congested.

42. The access node device of claim 41 wherein the acknowledgment packet is stored in the acknowledgment packet buffer and gated out by the scheduler if the acknowledgment packet is a first acknowledgment packet to be buffered in the acknowledgment packet buffer during congestion.

43. The access node device of claim 42 wherein the acknowledgment control unit increases a spacing between acknowledgment packets gated from the acknowledgment packet buffer if the acknowledgment packet is the first acknowledgment packet to be buffered in the acknowledgment packet buffer during congestion.

44. The access node device of claim 39 wherein the data packet departure processor decreases a spacing between the release of acknowledgment packets from the acknowledgment packet buffer if congestion in the link layer entity has abated.

45. A method for providing acknowledgment pacing for acknowledgment packets to be sent to a source in response to receiving data packets from the source, comprising:

monitoring loading of a network;

generating a control signal for controlling the processing of acknowledgment packets based upon the loading of the network;

storing acknowledgment packets received from the acknowledgment control unit in an acknowledgment packet buffer; and releasing acknowledgment packets based upon the control signal.

46. The method of claim 45 wherein the releasing further comprises choosing acknowledgment packets to release based upon a queuing strategy.

47. The method of claim 46 wherein the queuing strategy comprises sending a head-of-line acknowledgment packet when aggregate acknowledgment packet buffering is used.

48. The method of claim 46 wherein the queuing strategy comprises a weighted-round-robin (WRR) process for selecting an acknowledgment packet in the acknowledgment packet buffer for release when per-class or per-flow acknowledgment packet buffering is used.

49. The method of claim 48 wherein the weighted-round-robin (WRR) process uses weights for weighting the selection of the acknowledgment packet for release inversely proportionally to a TCP maximum segment size (MSS) to the lessen a bias against smaller MSS flows.

50. The method of claim 46 wherein the queuing strategy comprises a fair-queuing (FQ) process for selecting an acknowledgment packet in the acknowledgment packet buffer for release when per-class or per-flow acknowledgment packet buffering is used.

51. The method of claim 45 wherein the generating the control signal for controlling the processing of acknowledgment packets comprises a acknowledgment packet arrival processes and a data packet departure process.

52. The method of claim 51 wherein the acknowledgment packet arrival process controls the processing of acknowledgment packets to the acknowledgment packet buffer by checking a congestion level of the network and deciding whether to hold acknowledgment packets in the acknowledgment packet buffer or to send the acknowledgment packet directly to the source without buffering the acknowledgment packets in the acknowledgment packet buffer.

53. The method of claim 51 wherein the deciding whether to hold acknowledgment packets in the acknowledgment packet buffer or to send the acknowledgment packet directly to the source without buffering the acknowledgment packets in the acknowledgment packet buffer further comprises determining if the network is congested, determining if the acknowledgment packet buffer is empty, storing an acknowledgment packet in the buffer if the network is congested or the acknowledgment packet is not empty, and forwarding the acknowledgment packet to the source if the acknowledgment packet buffer is empty and the network is not congested.

54. The method of claim 53 wherein the acknowledgment packet is stored in the acknowledgment packet buffer and gated out if the acknowledgment packet is a first acknowledgment packet to be buffered in the acknowledgment packet buffer.

55. The method of claim 54 further comprising increasing a spacing between acknowledgment packets gated from the acknowledgment packet buffer if the acknowledgment packet is the first acknowledgment packet to be buffered in the acknowledgment packet buffer.

56. The method of claim 55 wherein increasing the spacing further comprises setting a packet counter variable to a first predetermined value.

57. The method of claim 56 further comprising decrementing the packet counter variable when a data packet departs from the network.

58. The method of claim 57 further comprising releasing a buffered acknowledgment packet when the packet counter variable is decremented to zero and resetting the packet counter variable.

59. The method of claim 52 wherein the congestion level of the network is determined by analyzing a queue length representing a capacity for a data packet buffer.

60. The method of claim 59 further comprising indicating the network is not congested when the queue length is less than a low threshold.

61. The method of claim 59 further comprising indicating the network is congested when the queue length is greater than a high threshold.

62. The method of claim 51 wherein the releasing further comprises monitoring congestion levels of the network and deciding when to gate acknowledgment packets from the acknowledgment buffer to the source.

63. The method of claim 62 wherein the deciding further comprises checking if acknowledgment packets are in the acknowledgment packet buffer awaiting transmission and if a packet counter variable set by the acknowledgment control unit has a value of zero, and releasing a buffered acknowledgment packet in the acknowledgment packet buffer to the source when the packet counter variable has a value of zero.

64. The method of claim 63 wherein the data packet departure process further comprises increasing the spacing between the release of acknowledgment packets from the acknowledgment packet buffer if congestion still exists in the network.

65. The method of claim 64 wherein the increasing further comprises resetting the packet counter variable to a first predetermined value.

66. The method of claim 65 wherein the data packet departure process further comprises decrementing the packet counter variable if the value of the packet counter variable is non-zero.

67. The method of claim 66 wherein the data packet departure process further comprises resetting the packet counter variable to the second predetermined value to prevent bandwidth under-utilization after congestion periods if the packet counter variable is larger than the second predetermined value.

68. The method of claim 63 wherein the data packet departure process further comprises decreasing a spacing between the release of acknowledgment packets from the acknowledgment packet buffer if congestion in the network has abated.

69. The method of claim 68 wherein the data packet departure process further comprises decreasing a spacing between the release of acknowledgment packets by resetting the packet counter variable to a second predetermined value, the second predetermined value being less than the first predetermined value.

70. The method of claim 69 wherein the data packet departure process further comprises decrementing the packet counter variable if the value of the packet counter variable is non-zero.

71. The method of claim 70 wherein the data packet departure process further comprises resetting the packet counter variable to the second predetermined value to prevent bandwidth under-utilization after congestion periods if the packet counter variable is larger than the second predetermined value.

72. The method of claim 63 wherein the determining of the congestion level of the network further comprises analyzing a queue length representing a capacity for a data packet buffer.

73. The method of claim 72 further comprising indicating the network is not congested when the queue length is less than a low threshold.

74. The method of claim 72 further comprising indicating the network is congested when the queue length is greater than a high threshold.

75. The method of claim 45 wherein the storing further comprises buffering acknowledgment packets on an aggregate basis.

76. The method of claim 45 wherein the storing further comprises buffering acknowledgment packets by flow type, and wherein the releasing further comprises scheduling the release of acknowledgment packets in the acknowledgment buffer by taking into account the type of flows for the buffered acknowledgment packets.

\* \* \* \* \*